J. P. GOMES.
BALING PRESS.
APPLICATION FILED APR. 27, 1914.

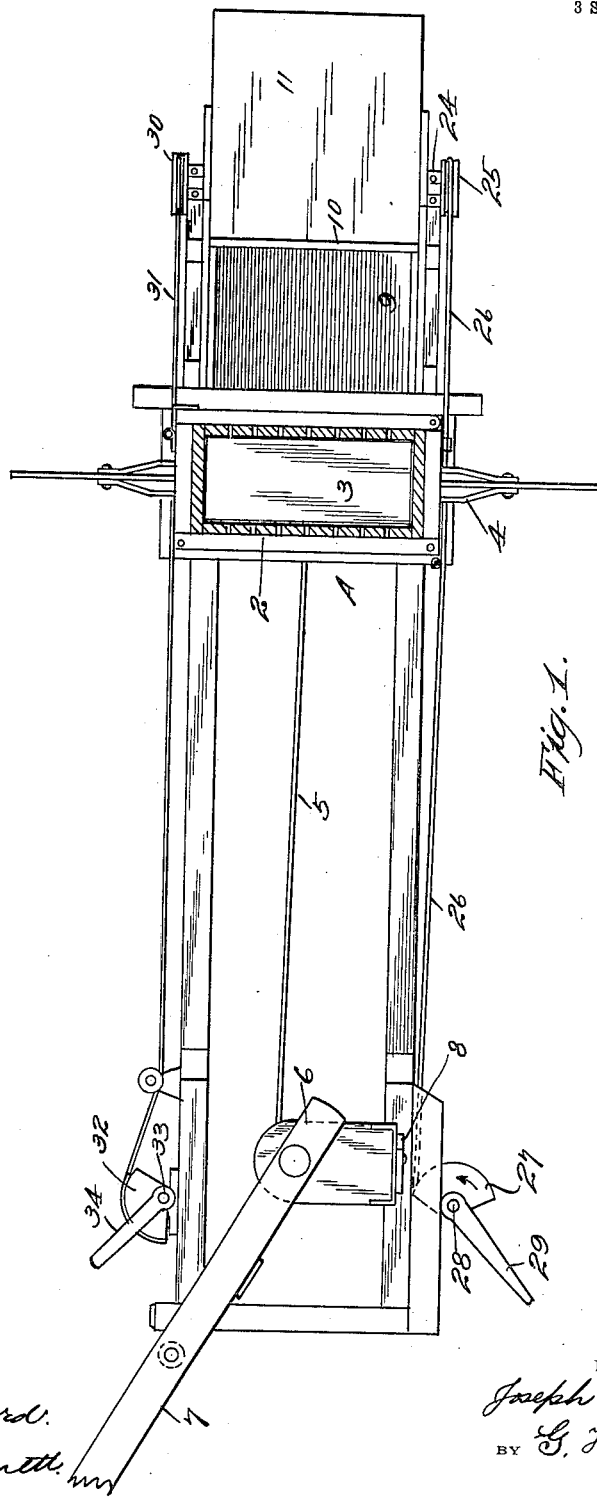

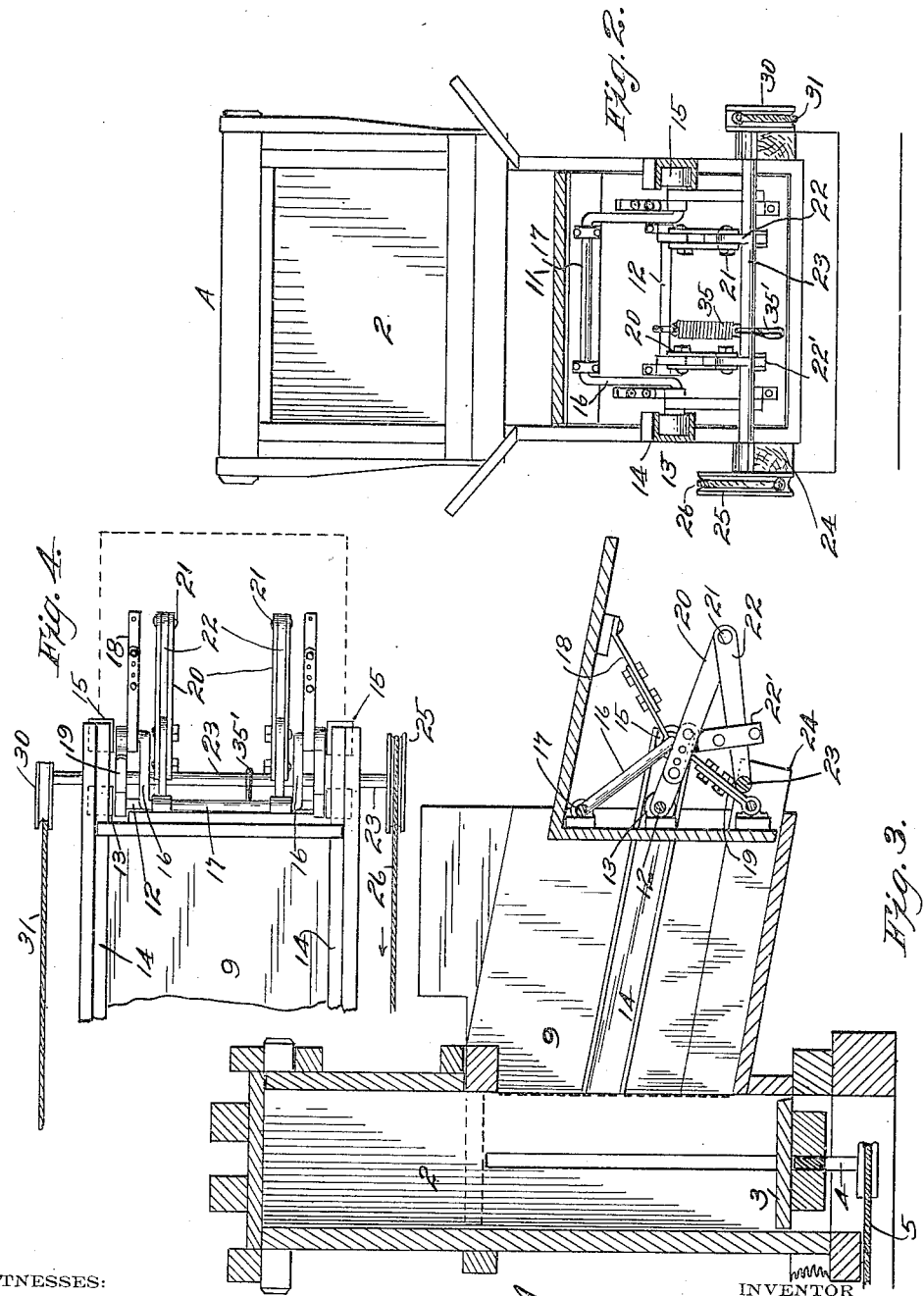

1,126,446.

Patented Jan. 26, 1915.

3 SHEETS—SHEET 3.

WITNESSES:
F. C. Maynard
Irvine Sinnett.

INVENTOR,
Joseph P. Gomes
BY G. H. Strong
ATTORNEY

UNITED STATES PATENT OFFICE.

JOSEPH P. GOMES, OF WATSONVILLE, CALIFORNIA.

BALING-PRESS.

1,126,446.   Specification of Letters Patent.   Patented Jan. 26, 1915.

Application filed April 27, 1914. Serial No. 834,604.

*To all whom it may concern:*

Be it known that I, JOSEPH P. GOMES, a citizen of the United States, residing at Watsonville, in the county of Santa Cruz and State of California, have invented new and useful Improvements in Baling-Presses, of which the following is a specification.

My invention relates to baling-presses, and particularly to hay-presses and self-feeding attachments therefor.

The object of the invention is to effect certain improvements in baling-presses of the vertical type, whereby the charging of the press may be speedily and economically done; all as will hereinafter appear.

The invention consists of the parts and the construction and combination of parts as hereinafter more fully described and claimed, having reference to the accompanying drawings, in which—

Figure 6:
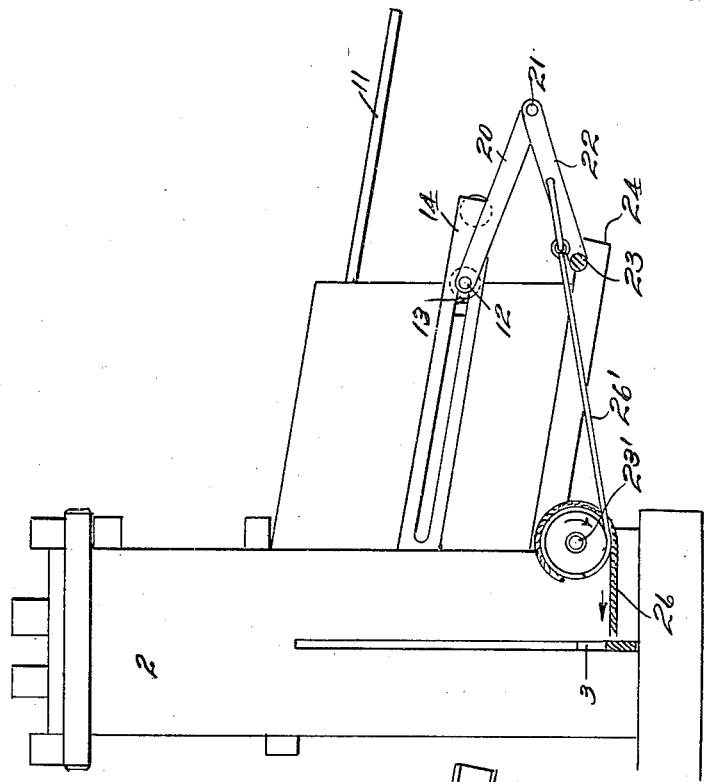
Figure 5:
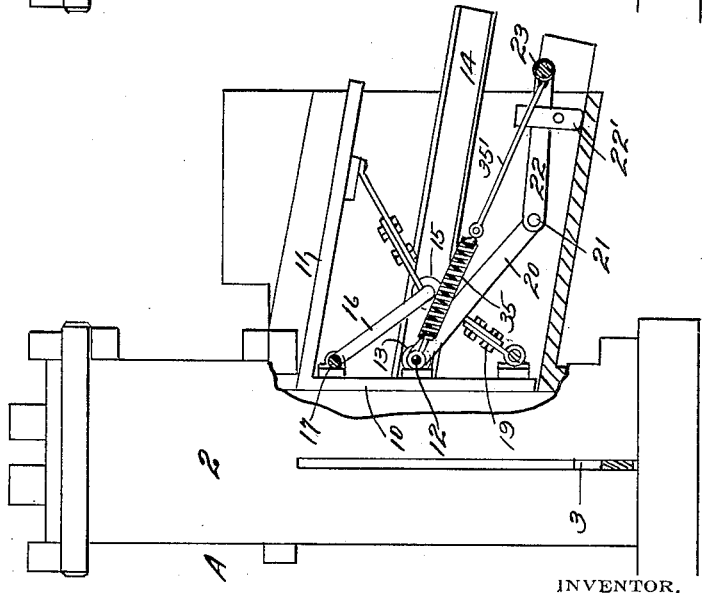

Figure 1 is a plan view of the press partly in section. Fig. 2 is a rear-end view of the press. Fig. 3 is a vertical section centrally through the feed chamber feeder. Fig. 4 is a plan view of the feeder and its operating mechanism partly in section. Fig. 5 shows the follower in its innermost position. Fig. 6 shows a slightly modified form of the invention.

A represents a baling-press having the usual baling chamber 2 and follower 3, and the toggles 4 by which the follower is reciprocated through suitable connections 5 with the drum of the horse-power 6.

7 is the usual sweep by which the horses are attached, and this sweep is adapted at each revolution to engage the usual latch 8 to wind up the horse-power and raise the follower; the latch 8 being tripped at a suitable point in the rotation of the sweep to release the latch from the sweep and allow the follower to descend by gravity to initial position at the bottom of the baling chamber.

The baling chamber 2 is open at one side near the bottom, through which opening the material to be baled is delivered from the feeding chamber 9 by the reciprocating feeder or pusher 10. This pusher 10 slides back and forth in the bottom of and between the sides of the feeding chamber 9, its reciprocations being effected by appropriate mechanism.

The feeder 10 comprises an upright transverse board or panel with a rearwardly extending cover or platform structure 11. Suitably mounted upon the rear of the feeder 10 is a roller-shaft 12 carrying at its ends rollers 13 which run in guide-ways or tracks 14, disposed in the opposite side walls of the feed chamber 9, and which tracks 14 are of sufficient length to support and guide a rear set of rollers 15, which are shown as mounted on the crank-arms 16 of a crank-shaft 17, mounted on the rear of the feeder 10. The relative position of the axis of the rollers 15 as to the rear of the feeder panel 10 may be determined by the adjustment of adjustable braces 18—19, the former of which extend upwardly and rearwardly from the ends of the cranks 16, being attached to and supporting the rear portions of the platform 11, while the braces 10 project from the ends of the cranks 16 downwardly and connect to the lower portion of the feeder panel 10. By means of the adjustable braces 18—19 the annular position of the panel 10 can be varied and determined with relation to the fulcrum rollers 13 as may be necessary or desirable.

In its present embodiment, my invention discloses the slidable feeder 10 as movable in an inclined plane rearwardly and downwardly from the baling chamber 2 and when in the rearmost position as shown in Fig. 3, provides ample space for the reception of material to be baled, and avoids clogging of the follower 3 as it moves downwardly, because of the fact that the material being charged collects in the large chamber 9 and is not directed toward the bottom of the baling chamber 2. When a sufficient amount of material to be baled has been charged into the feeding chamber 9 the feeder 10 is moved forwardly and upwardly along the guides 14 to feed the material into the baling chamber 2 above the follower 3.

The movement of the feeder 10 is accomplished in the present invention through means connected to the feeder shown in the present instance as comprising adjustable links 20, the inner ends of which may be pivoted upon the roller-shaft 13, and the outer ends of which are connected at 21 to crank-arms 22 of a transversely extending crank-shaft 23, journaled in bearing members 24 of the press.

Any suitable means may be employed for rotating the crank-shaft 23, and in the present instance there is secured on one end thereof a drum or wheel 25, attached to which is a connection 26, suitably guided and extended forwardly to and connecting with an operating device here shown as comprising a segmental pulley 27 fast on a shaft 28, carrying a lever 29, which is disposed in the path of a coöperative device or part of the sweep 7, so that during a portion of a rotation of the sweep, power will be transmitted therefrom to and through the co-acting lever 29, to turn the shaft 28 and its segmental pulley 27, to pull upon the draft connection 26, and this in turn operates the crank-shaft 23 and throws the cranks 22 upwardly and forwardly and through the instrumentality of the connecting links 20 moves the feeder 10 inwardly to feed a charge of material in the feed chamber 9 into the baling chamber 2, and over the follower 3. Subsequently, the sweep 7 will be coupled to the horse-power 6, for the winding of the member 5, and through it and the toggle levers 4, lift the follower 3 to compress the charge into a bale in the upper part of the press.

At a predetermined time during the operation of the press, the feeder 10 is retracted through any suitable means, in this instance, comprising a segmental sheave 30, secured upon the opposite end of the crank-shaft 23 from the drum 25, and to which sheave is attached a connection 31, guided and extended forwardly, and connected with a winding device or segmental shaft 32, attached to which is a shaft 33 which is provided with an operating lever 34, coöperable with the sweep 7 for a portion of the movement of the latter, the actuation of the winding-shaft 32 turning the crank-shaft 30 in an opposite direction to that in which it is turned through the winding connection 26, and thus serving to retract the follower 10 from its innermost position, indicated in dotted lines, in Fig. 3.

It is understood that while I have shown the follower 10 as retractable through the instrumentality of direct connection with the horse-power, it may be retracted or allowed to move rearwardly by other means.

For the purpose of limiting the angular movement of the cranks 22, suitable stops are provided here, being shown as bumpers 22', adjustably mounted upon the cranks 22 and adapted when the cranks are thrown forward, to abut the bottom of the feed-box or chamber 9, the same stop device or bumpers 22 being useful to limit the retracting movement of the feeder 10 by engagement with the links 20, as shown in Fig. 3.

I have provided a baling-press which includes a large and spacious chamber so disposed and designed that the material being charged thereinto will rest separate from the baling chamber until it is forcibly fed thereinto by the feeder; and by providing the latter with a top member of considerable area, the feeding operation may be continuous, irrespective of the position of the feeder, because while the feeder is closed or is approaching the closed position, the material being charged to the feed chamber will collect upon the large platform 11, and when the feeder is retracted the charge of material on the top of the platform 11 will be precipitated into the feed box in front of the feeder. The rearward movement of the feeder 11 from its closed position will be accelerated by connecting a spring 35 of suitable strength to the back of the apparatus, the spring being tensioned as the cranks 22 throw the feeder 10 forwardly, the connections 21 of the cranks to the links 20 preferably passing the center line projected between the crank-shaft 23 and the roller-shaft 12 when the feeder is in its innermost position after the connections 21 have passed the above-mentioned center line, and conversely, when the retracting means of the feeder are actuated, and the crank-shaft 23 rotated to throw the cranks 22 rearwardly as the connections 21 thereof pass the center line between the center of the crank-shaft 23, and the innermost position of the roller-shaft 12, the contractile force of the spring 35 will operate to quickly project the feeder 10 to its rearmost position. The spring 35 may be connected to a relatively stationary member of the apparatus by a suitable flexible means, as a cable 35', which is here shown as attached to the crank-shaft 23 which, while having a rotary movement, has no other relative movement as to the feeder 10, though as stated, the spring 35 and its attachment 35' may be otherwise appropriately connected to the apparatus.

In Fig. 6 the crank shaft 23 is shown as operated by an intermediate drum shaft 23' connected by a suitable connection as cable 26' to the crank arms 22. The drum shaft is operated by the connection 26 to the horse-power pulley.

Having thus described my invention, what I claim and desire to secure by Letters Patent is:

1. In a baling-press, having a baling chamber and a feed chamber in comunication therewith through the rear side, a follower in the baling chamber, a feeder in the feed chamber forming a movable rear wall of the baling chamber, a horse-power, connections with the horse-power for operating the feeder to deliver a charge from the feed chamber into the baling chamber, connections with the horse-power for operating the follower, and means operative by the horse-power to retract the feeder.

2. The combination in a baling-press having a baling chamber and a feed chamber in communication at the bottom with the baling chamber, a feeder in the feed chamber forming a movable rear wall of the baling chamber, a horse-power, means operative by the horse-power for actuating the follower to compress a charge, and means for advancing and retracting the feeder.

3. The combination in a baling-press having a baling chamber and a feed chamber in communication at the bottom with the baling chamber, a horse-power, means operative by the horse-power for actuating the follower to compress a charge, a feeder forming a movable wall of the baling chamber, and means including cranks connected to and operating the feeder.

4. The combination in a baling-press having a baling chamber and a feed chamber in communication at the bottom with the baling chamber, of a follower in the baling chamber, a horse-power operating said follower, a feeder forming a wall of the baling chamber, a crank-shaft operative by the horse-power, and connections between said crank-shaft and the feeder for advancing and retracting the latter.

5. The combination in a baling-press having a baling chamber and a feed chamber in communication with the baling chamber, of a follower in a baling chamber, a horse-power operating said follower, a feeder forming a wall of the baling chamber, a crank-shaft operative by the horse-power, connections between said crank-shaft and the feeder for advancing and retracting the latter, and a spring for accelerating the speed during the retracting movement of the feeder.

6. The combination in a baling-press having a baling chamber, of a feed chamber communicating with the baling chamber, fixed guides along the sides of the feed chamber, a feeder mounted in the feed chamber and having rollers operating on said sides.

7. The combination in a baling press having a baling chamber, of a feed chamber communicating with the baling chamber, fixed guides along the sides of the feed chamber, a feeder mounted in the feed chamber having rollers operating on said guides, and means for adjusting the angular position of the front of the feeder in said chamber.

8. The combination in a baling-press having a baling chamber, of a feed chamber communicating with the baling chamber, fixed guides along the sides of the feed chamber, a feeder mounted in the feed chamber having rollers operating on said guides, means for adjusting the angular position of the front of the feeder in said chamber, and means for advancing and retracting said feeder.

9. In a baling-press having a baling chamber and a follower in the baling chamber, the combination with the said chamber, of a feed chamber communicating therewith, a pusher having rollers on each side, running on the walls of the feed chamber, a crank-shaft operative from a suitable source of power, and connections between said crank-shaft and the feeder for advancing and retracting the latter.

10. In a baling-press having a baling chamber and a follower in the baling chamber, the combination of the said chamber, of a feed chamber communicating therewith, a pusher having rollers on each side, running on the walls of the feed chamber, a crank-shaft operative from a suitable source of power, connections between said crank-shaft and the feeder for advancing and retracting the latter, and means for automatically retracting the feeder with a speed accelerated over the normal retractive movement of the crank.

11. In a baling-press the combination with a baling chamber having a power-operated follower therein, of a feeding chamber, a feeder movable in said chamber having a front feeding portion and a top forming a platform on which material charged will be supported during and while the feeder is in its forward feeding position, means for supporting the feeder in a substantially vertical position during movement, a crank shaft operative by a suitable power mechanism, and links connecting said shaft and the feeder.

In testimony whereof I have hereunto set my hand in the presence of two subscribing witnesses.

JOSEPH P. GOMES.

Witnesses:
JOHN H. HERRING,
W. W. HEALEY.

Copies of this patent may be obtained for five cents each, by addressing the "Commissioner of Patents, Washington, D. C."